Oct. 11, 1955
A. EISELE
2,720,033
BORE MEASURING DEVICE
Filed March 5, 1953
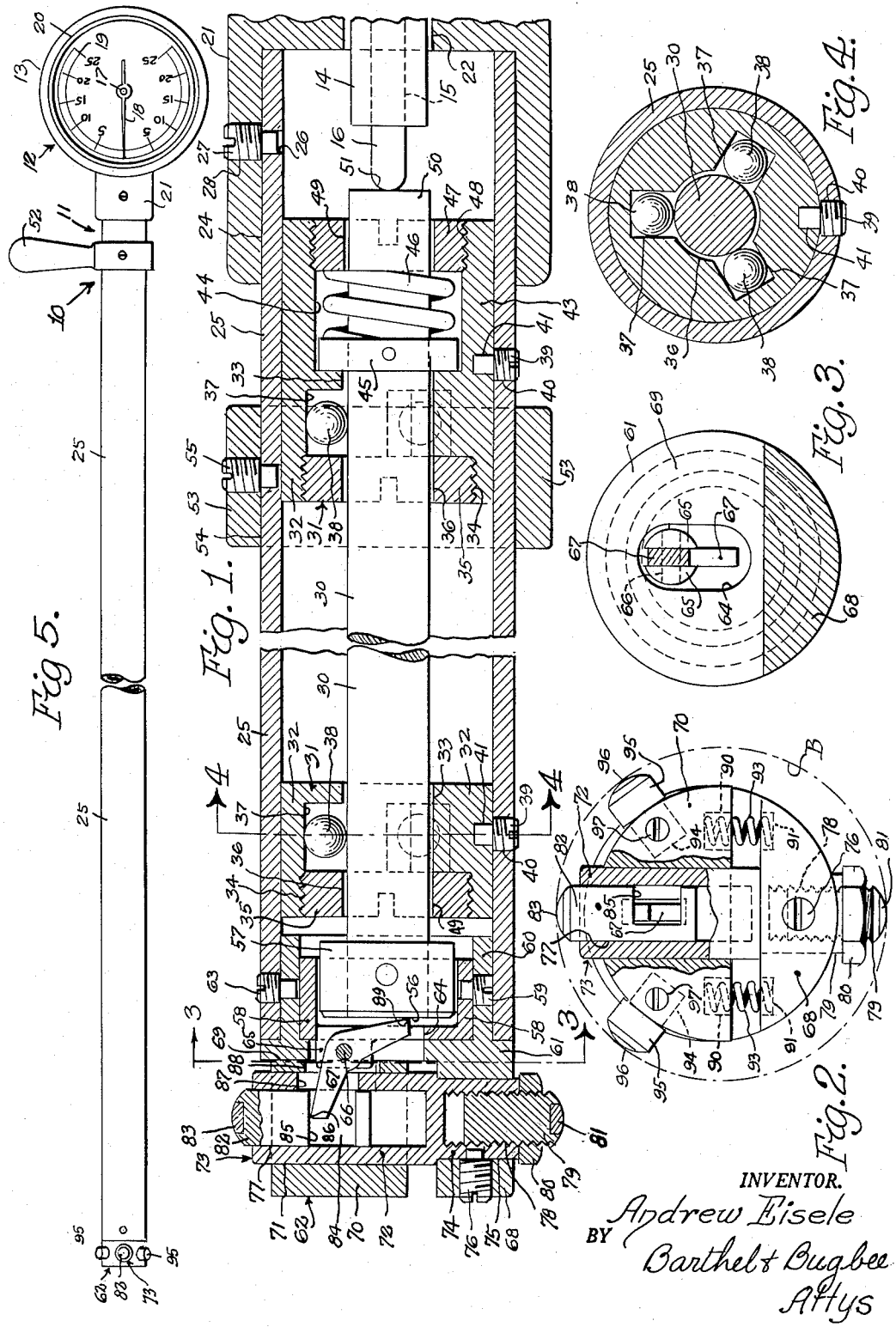
INVENTOR.
Andrew Eisele
BY Barthel & Bugbee
Attys ём
United States Patent Office 2,720,033
Patented Oct. 11, 1955

2,720,033

BORE MEASURING DEVICE

Andrew Eisele, Detroit, Mich.

Application March 5, 1953, Serial No. 340,448

2 Claims. (Cl. 33—178)

This invention relates to gauges and, in particular to bore gauges or internal gauges.

One object of this invention is to provide a bore gauge which is particularly well adapted for measuring the diameters of deep bores and which has simple but efficient operating mechanism which is precise and sensitive.

Another object is to provide a bore gauge wherein the motion-transmitting mechanism from the measuring pin to the dial indicator or other measurement indicating instrument includes an obtuse-angled lever and a reciprocating rod, this mechanism being especially accurate and sensitive for the transmitting of the very minute motions arising in the measurement of bores.

Other objects and advantages of the invention will become apparent during the course of the following description of the accompanying drawings, wherein:

Figure 1 is a central longitudinal section through a bore gauge according to one form of the invention with the midportion and dial indicator thereof omitted to conserve space;

Figure 2 is a left-hand end elevation of the bore gauge shown in Figure 1;

Figure 3 is a cross-section through the measuring head taken along the line 3—3 in Figure 1;

Figure 4 is a cross-section through the supporting barrel or tubular stem taken along the line 4—4 in Figure 1, showing the manner of supporting the motion-transmitting rod in antifriction bearings; and Figure 5 is a side elevation upon a reduced scale of the bore gauge shown in Figures 1 to 4 inclusive.

Referring to the drawings in detail, Figure 5 shows a bore gauge, generally designated 10, according to one form of the invention, as consisting generally of a motion-producing and transmitting unit, generally designated 11, and a motion measuring unit, generally designated 12, mounted thereon for determining the exact amount of motion resulting from gauging the bore to be measured.

In Figures 1 and 5, the bore gauge 10 is shown for convenience of arrangement on the drawing sheet as lying in a horizontal position, as when placed on its side or when stored horizontally in its case (not shown). In actual use, however, in the majority of bore-measuring jobs, the axis of the bore is vertical or upwardly-inclined, hence the bore gauge in the majority of measurements is therefore used in a vertical position, with the motion-measuring unit 12 uppermost and the motion-producing and transmitting unit directed downward, as explained below in connection with the operation of the invention. For this reason, the terms "upper" and "lower" are appropriately used in the following description.

The motion-measuring unit 12 is conventional and may be of any suitable type, such as the so-called "dial indicator" well known to those skilled in the mechanical industries. The dial indicator 12 may be described briefly as a cylindrical case 13 having a tubular stem 14 containing a bore 15 with a reciprocable plunger 16 (Figure 1). The reciprocable plunger 16 is connected by motion-multiplying mechanism, such as gearing, to a needle shaft 17 carrying a needle or pointer 18 (Figure 5) registering with a graduated scale 19 upon a rotatable bezel 20 for setting the instrument to zero. The dial indicator 12 is mounted in a tubular member or sleeve 21 having a bore 22 for receiving the stem 14 and a counterbore 24 for receiving the elongated measuring head stem 25 with a hole 26 receiving the set screw 27 threaded through the aligned hole 28 in the tubular member 21.

Reciprocably mounted in the elongated stem 25 is a motion-transmitting rod 30 which is mounted in longitudinally-spaced anti-friction ball bearing units, generally designated 31, one of which is shown in Figure 4. This consists of a casing 32 having a central bore 33 for the passage of the rod 30 and a threaded counterbore 34 receiving a threaded plug 35 with a central hole 36. Extending radially outward from the central bore 33 are recesses or ball sockets 37 containing anti-friction bearing balls 38 which engage the rod 30 (Figure 4). A set screw 39 threaded through the hole 40 in the tubular stem 25 enters a recess 41 in the casing 32, locking the latter in position.

The casing unit 32 of the anti-friction ball bearing unit 31 nearest the motion-measuring unit 12 (Figure 1) is provided with a tubular extension 43 which is bored as at 44 coaxial with the bore 33 but on a larger diameter. The bore 44 receives a collar 45 which is pinned or otherwise secured to the motion-transmitting rod 30 and which serves as an abutment for a helical compression spring 46, the opposite end of which abuts an annular screw plug 47 threaded into the threaded mouth 48 of the bore 44 and having a central opening 49 for the passage of the rod 30, the upper end 50 of which engages the rounded end 51 of the dial indicator plunger 16. A handle 52 is provided for manipulating the bore gauge 10 and is connected to the tubular stem 25 by a ring-shaped portion 53 encircling the stem 25 and bored as at 54 to receive it. A set screw 55 secures the ring portion 53 to the stem 25.

Pinned or otherwise secured to the lower end 56 of the rod 30 is a collar 57 which enters a cup-shaped member 58, which in turn is secured by the set screw 59 to the tubular shank 60 of a measuring head casing 61 for a measuring head, generally designated 62. The tubular shank 60 is in turn secured within the end of the bore 24 by a set screw 63. The bottom wall of the cup-shaped member 58 is provided with a diametrically-disposed slot 64 on opposite sides of which project parallel ears 65 which are bored transversely to receive a pivot pin 66 upon which is pivotally mounted an obtuse-angled bent lever 67. The casing 61 at its outer end is cut away or rabbeted to provide a partially cylindrical integral projecting portion or boss 68 and an adjacent flat abutment or guide surface 69. Slidably mounted upon the abutment or guide surface 69 is a semi-cylindrical slide block 70 having a transverse bore 71 therein.

The slide block 70 is also slidably mounted upon the tubular body 72 of a measuring pin assembly, generally designated 73, which has its bore 71 receives and engages. The tubular body 73 has a reduced diameter portion 74 seated in a bore 75 in the boss 68 and held therein by a set screw 76 (Figure 1). Coaxial with the bores 71 and 75 are two bores 77 and 78 within the tubular body 73, the latter being threaded and receiving a correspondingly threaded stationary measuring pin 79 held in place by a lock nut 80 and containing the hardened spherical-headed insert 81 of wear-resisting material, such as, for example, sintered tungsten carbide.

Reciprocably mounted in the smooth-walled bore 77 of the tubular body 72 is a movable measuring pin 82 also having a hardened spherical-headed insert 83 in the outer end thereof and provided intermediately with a transverse notch 84, one wall 85 of which is engaged by the pointed outer end 86 of the bent lever 67 which projects through a slot 87 in the side wall of the tubular body 72, and also through an elongated hole 88 in the slide block 70. The opposite pointed end 89 of the bent lever 67 engages the end 56 of the motion-transmitting rod 30.

The adjacent walls of the slide block 70 and boss 68 are provided with aligned sockets 90 and 91 respectively (Figure 2) receiving helical compression springs 93 which urge the slide block 70 outwardly along the tubular body 72 as a guide rod. The outer surface of the slide block 70 is provided with two sockets 94, the axes of which are inclined at equal acute angles to the axis of the bores 71 and 77. Mounted in the sockets 94 are the shanks of locating pins 95 having rounded hardened inserts 96 of sintered tungsten carbide or other suitable material. The locating pins 95 and the stationary measuring pin 79 are locked in position by set screws 97 and lock nut 80 respectively (Figure 2).

In the operation of the invention, when the user desires to measure the diameter of the bore, he grasps the handle 52 in one hand (Figure 5) and inserts the measuring head 62 in a bore by pushing the elongated stem 25 downwardly into the bore to be measured. It will be assumed, of course, that the diameter spanned by the ends 81 and 83 of the stationary and movable measuring pins 79 and 82 respectively corresponds approximately to the diameter of the bore B to be gauged, but exceeds it in diameter. As the measuring head 62 enters the bore B to be gauged (Figure 2), the end 81 of the stationary measuring pin 79, being immovable, serves as an abutment or stop against one side of the bore B while the ends 83 and 96 of the movable measuring pin 82 and locating pins 95 respectively engage the opposite side of the bore B and are pushed inwardly thereby. This action causes the slide block 70 to slide along the tubular body 72 until the locating pins 95 come to rest equally against their respective portions of the bore B, centering the measuring head 62 within the bore B and locating the axis of the coaxial stationary and movable measuring pins 79 and 82 upon the true diameter of the bore B.

Meanwhile, as the movable measuring pin 82 is forced inwardly into the bore 77 in the tubular body 72, the corresponding motion of the side wall 85 of the notch 84, being in engagement with the pointed end 86 of the bent lever 67, forces the end 86 inward and consequently swings the bent lever 67 around its pivot pin 66. This action causes the pointed end 89 to swing in a similar manner, pushing the motion-transmitting rod 30 to the right or upward within the tubular stem 25 by its engagement with the lower end 56 thereof. The upper end 50 of the motion-transmitting rod 30 by its engagement with the rounded end 51 of the dial indicator plunger 16 shafts the latter a corresponding amount and this shift, amplified by the motion-multiplying mechanism within the dial indicator casing 13, is registered by the consequent rotation of the shaft 17 which swings the needle 18 into registry with the graduated scale 19 on the bezel 20 which is assumed to have been set previously at zero by inserting the measuring head 62 into a standard bore of the desired diameter. As the motion-transmitting rod 30 moves longitudinally within the tubular stem 25, it is guided in its reciprocation by the anti-friction bearing balls 38 mounted in the anti-friction bearing units 31. The slide block 70 is limited in its outward travel by the end of the elongated hole 88 engaging the ears 65 (Figures 1 and 3) so that it cannot escape from the tubular body 72 of the measuring pin assembly 73.

What I claim is:

1. A bore measuring device for use with a dial indicator, comprising a tubular support, a motion-transmitting member reciprocably mounted within said support and engageable with the operating mechanism of said dial indicator, a measuring head casing structure mounted on said support and having a transverse bore disposed perpendicularly to said motion-transmitting member, a movable measuring element reciprocably mounted in said bore and having an abutment surface thereon, a motion-transmitting bell-crank lever pivotally mounted within said casing structure and having oppositely-extending arms with contact portions on the outer ends thereof, one of said contact portions engaging said abutment surface and the other contact portion engaging said motion-transmitting member, and a fixed measuring element stationarily mounted on the opposite side of said casing structure from said movable element, said casing structure including an inner tubular lever mount carrying the pivot for said lever and an outer tubular shank telescopingly engaging said tubular support externally and telescopingly receiving said lever mount internally.

2. A bore measuring device for use with a dial indicator, comprising a tubular support, a motion-transmitting member reciprocably mounted within said support and engageable with the operating mechanism of said dial indicator, a measuring head casing structure mounted on said support and having a transverse bore disposed perpendicularly to said motion-transmitting member, a movable measuring element reciprocably mounted in said bore and having an abutment surface thereon, a motion-transmitting bell-crank lever pivotally mounted within said casing structure and having oppositely-extending arms with contact portions on the outer ends thereof, one of said contact portions engaging said abutment surface and the other contact portion engaging said motion-transmitting member, and a fixed measuring element stationarily mounted on the opposite side of said casing structure from said movable element, said casing structure including a projecting portion and a tubular element mounted on said projecting portion transversely to said motion-transmitting member, said tubular element containing said bore in which said movable measuring element is reciprocably mounted.

References Cited in the file of this patent

UNITED STATES PATENTS

| 1,431,615 | Wittner | Oct. 10, 1922 |
| 1,740,695 | Johansson | Dec. 24, 1929 |
| 2,095,405 | Aldeborgh et al. | Oct. 12, 1937 |
| 2,312,222 | Tanner | Feb. 23, 1943 |
| 2,581,473 | Eisele | Jan. 8, 1952 |

FOREIGN PATENTS

| 1,217 of (1899) | Great Britain | Jan. 23, 1889 |
| 644,333 | Germany | Apr. 29, 1937 |
| 211,133 | Switzerland | Nov. 1, 1940 |